(12) United States Patent
Radaelli et al.

(10) Patent No.: US 6,663,080 B2
(45) Date of Patent: Dec. 16, 2003

(54) HERMETIC-SEAL VALVE FOR A THERMAL-REGENERATION PLANT FOR DEPURATION OF EMISSIONS

(76) Inventors: Angelo Radaelli, Via Barsanti 12/F, Cava Manara, Pavia (IT); Stefano Torghele, Via Puccini, 8, Zibido San Giacomo, Milan (IT)

(*) Notice: Subject to any disclaimer, the term of this patent is extended or adjusted under 35 U.S.C. 154(b) by 56 days.

(21) Appl. No.: 10/117,491

(22) Filed: Apr. 4, 2002

(65) Prior Publication Data

US 2002/0171058 A1 Nov. 21, 2002

(30) Foreign Application Priority Data

May 15, 2001 (IT) ..................... MI20010271 U

(51) Int. Cl.[7] .............................................. F16K 51/00
(52) U.S. Cl. ...................................... 251/359; 251/175
(58) Field of Search ............................... 251/157–204, 251/359–365

(56) References Cited

U.S. PATENT DOCUMENTS

| | | |
|---|---|---|
| 1,387,841 A | 8/1921 | Dempler |
| 2,086,203 A | 7/1937 | Maxwell |
| 3,911,948 A * | 10/1975 | Collins, Jr. ............... 251/363 |
| 4,779,647 A * | 10/1988 | Christian ................. 251/363 |
| 4,945,941 A * | 8/1990 | Kocher .................... 251/364 |
| 5,129,332 A | 7/1992 | Greco |
| 6,000,416 A * | 12/1999 | Kingsford et al. ......... 251/359 |
| 6,039,927 A | 3/2000 | Greco |

FOREIGN PATENT DOCUMENTS

| | | |
|---|---|---|
| DE | 199 05 733 | 8/2000 |
| FR | 679464 | 4/1930 |
| FR | 707275 | 7/1931 |

OTHER PUBLICATIONS

EP Search Report.

* cited by examiner

*Primary Examiner*—Paul J. Hirsch
(74) *Attorney, Agent, or Firm*—Hedman & Costigan, P.C.

(57) ABSTRACT

A hermetic-seal valve for a thermal-regeneration plant for depuration of emissions, where the valve is set in a duct (13) which connects an inlet pipe (28) for entry of an emission that is to be treated or an outlet pipe (29) for exit of an emission that has been treated, and a treatment chamber (22), said valve comprising an obturator seating (14), an obturator (16) having the shape of a truncated cone for opening and closing the seating (14), and means (18) for actuating the obturator (16) via an interposed stem (20), in the said valve the seating (14) consisting of a ring (30), one internal top end of which has a circumferential undercut (50) shaped like a truncated cone and provided with a series of radial holes (54) connected to an external fan or to the outside environment (56, 57), the undercut (50) being provided with a first edge (52), which has a diameter equal to the diameter of the obturator seating (14) and a second edge (53), located above the first edge and of larger diameter, where both edges (52, 53) engage with the obturator (16) shaped like a truncated cone when the stem (20) is displaced.

6 Claims, 4 Drawing Sheets

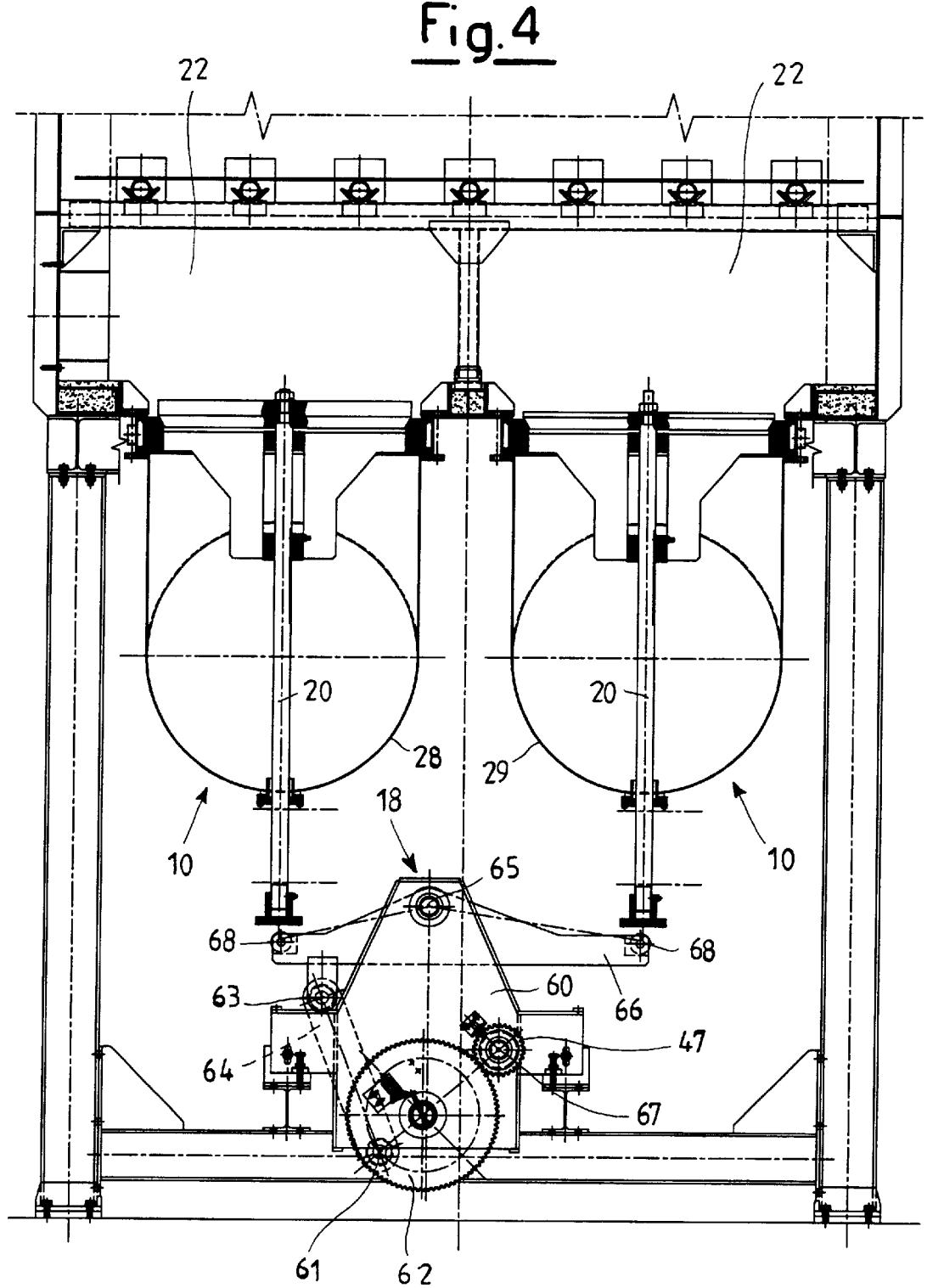

HERMETIC-SEAL VALVE FOR A THERMAL-REGENERATION PLANT FOR DEPURATION OF EMISSIONS

The present invention relates to a hermetic-seal valve for a thermal-regeneration plant for depuration of emissions.

The above-mentioned plants are designed for destroying by incineration volatile organic substances, together with the corresponding odours, contained in emissions or fumes, coming from various production lines, such as paint lines, lines for spreading or coating, or lines for various press operations.

The working principle involves increasing the temperature of the emissions, which contain volatile organic substances, by means of a ceramic-bed heat exchanger, and then getting them to enter a combustion chamber at a temperature of approximately 750° C. to carry out thermal oxidation.

On account of its capacity for storing thermal-combustion energy with the purpose of pre-heating the emissions of the process prior to incineration, the regeneration cycle provides the most efficient thermodynamic system of fume incineration.

Incineration of organic substances takes place with the production of heat, thus reducing the amount of fuel necessary for maintaining the incineration temperature.

The fumes thus treated leave the combustion chamber and pass through another ceramic-bed heat exchanger. This stream of cleansed fumes restores to the heat exchanger approximately 92% of its thermal energy, which will be used for pre-heating the subsequent fumes that are still to be treated.

In order to obtain a particularly high combustion efficiency, there must be a precise and continuous regulation of the plant.

Plant regulation is obtained by means of valves that enable the flow of gases present in the plant to be intercepted and to be directed into more adequate areas or chambers.

Plants of a regeneration type are known, which, albeit basically achieving the purposes referred to above, may be improved in so far as the valves used are not able to guarantee an optimal tightness in every situation and, in any case, over time.

In particular, their sealing capacity can be easily reduced by the mere accumulation of dirt between the obturator and its seating. In addition, the hermetic seal can be obtained only with the use of gaskets, which, on account of their limited working life, condition the reliability of the valves o n which they are installed, frequently rendering necessary maintenance operations.

The object of the present invention is to overcome the aforesaid drawbacks, i.e., to provide a hermetic-seal valve for a thermal-regeneration plant for depuration of emissions that will guarantee hermetic tightness without the use of a gasket. In this way, a high level of reliability is achieved, such as to increase the functional capacity and constancy of efficiency of the plant and to reduce plant maintenance costs and hence the running costs.

Another purpose of the present invention is to provide a hermetic-seal valve for a thermal-regeneration plant for depuration of emissions which is particularly simple and functional, at a contained cost.

The above purposes according to the present invention are achieved by providing a hermetic-seal valve for a thermal-regeneration plant for depuration of emissions, as specified in claim 1.

Further characteristics of the invention are specified in the dependent claims.

The characteristics and advantages of a hermetic-seal valve for a thermal-regeneration plant for depuration of emissions according to the present invention will emerge even more evidently from the ensuing description, which is provided by way of non-limiting example, with reference to the attached schematic drawings, in which.

Figure 3:
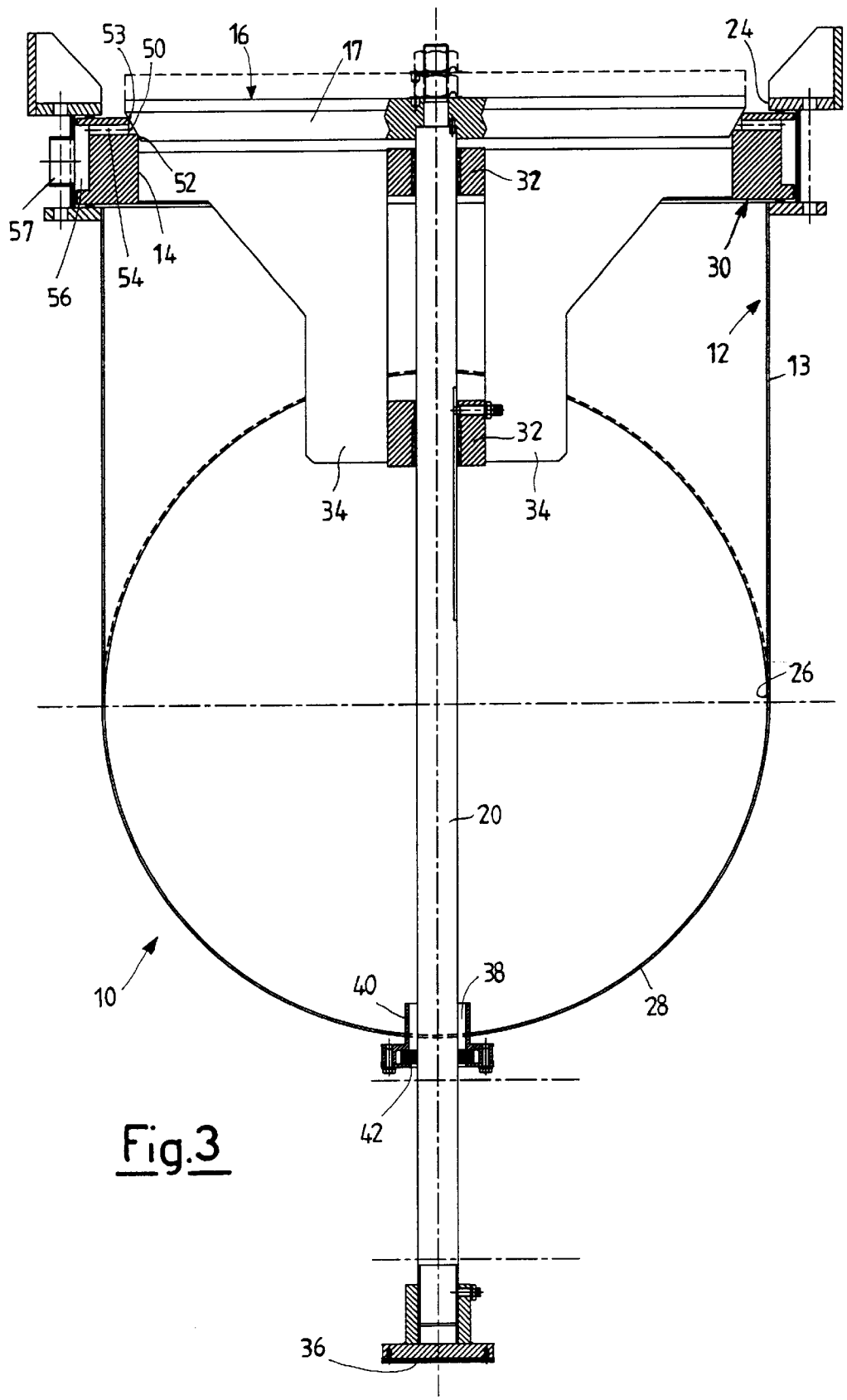

FIG. 3 is a cross-section at an enlarged scale of a hermetic-seal valve according to the invention, installed in situ between a pipe and a chamber of a thermal-regeneration plant for depuration of emissions; and FIG. 4 is a partial cross section of a thermal-regeneration plant for depuration of emissions, where two valves of the type illustrated in FIG. 3 are installed, said valves being provided at the bottom with a means for their actuation.

Figure 1:
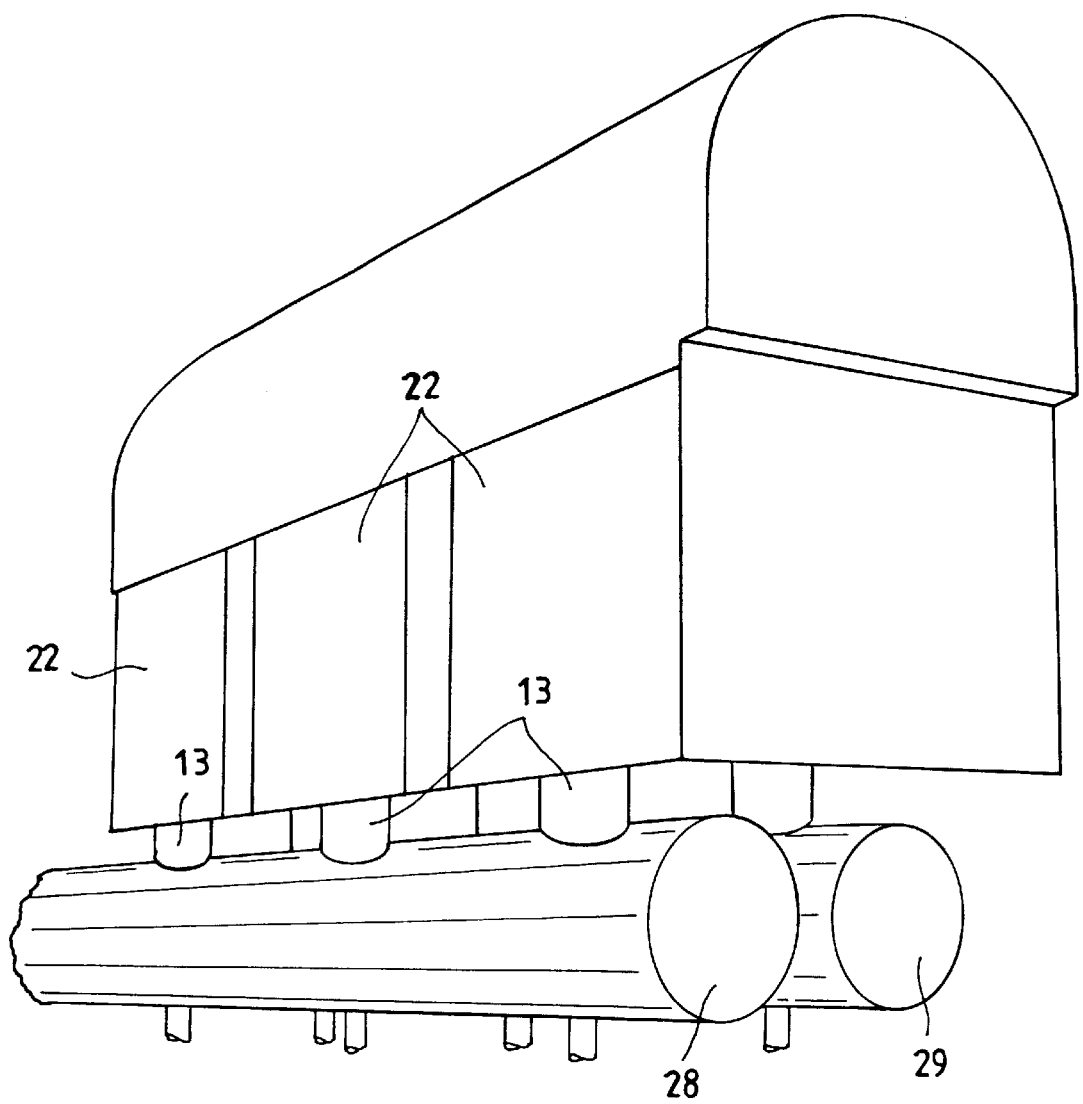
FIG. 1 is a schematic perspective view of a plant that uses valves according to the invention.
Figure 2:
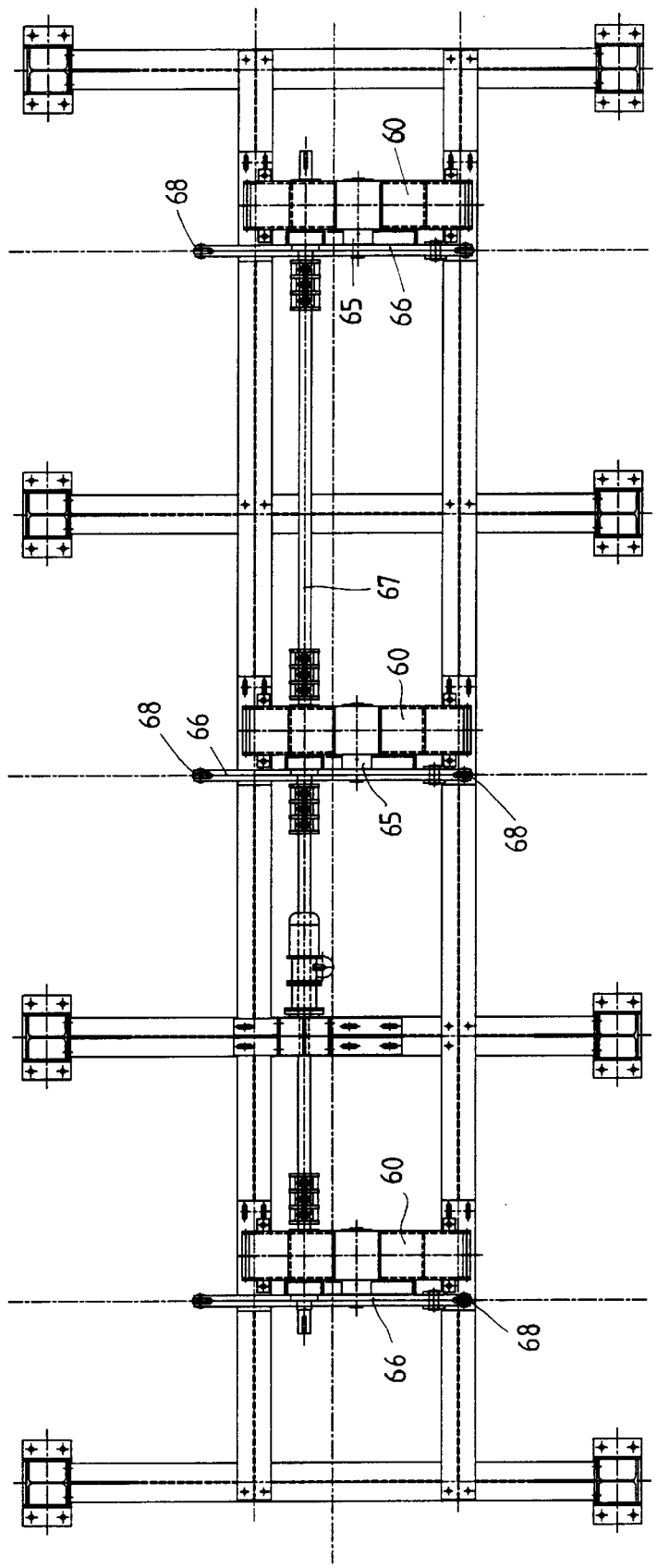
FIG. 2 is a top plan view of the plant of FIG. 1, which illustrates only the means for actuation of the valves.

With reference to FIGS. 1 and 2, a thermal-regeneration plant for depuration of emissions is schematically illustrated, in which an inlet pipe 28 feeds emissions or fumes to be treated through hermetic-seal valves 10 according to the invention towards treatment chambers 22. Then, once the polluting substances contained in the fumes or emissions have been eliminated, the purified air passes through further chambers 22 and valves 10 towards an outlet pipe 29.

With particular reference to FIG. 3, the valve 10 comprises a body 12, which defines an obturator seating 14, an obturator 16, and means 18 for actuating said obturator 16 via a stem 20 on which it is mounted.

The said body 12 of the valve 10 comprises a vertical duct 13, which connects a bottom circular opening 24 of the chamber or tower 22 (illustrated only partially in FIG. 4) of the aforesaid plant to a circular opening 26 of the underlying inlet pipe 28 for the emissions that are to undergo treatment.

The said openings 24 and 26 have one and the same vertical axis, and in the example illustrated in FIG. 3 the diameter of the circular opening 26 is equal to the internal diameter of the pipe 28.

The vertical duct 13 terminates at the top with a ring 30 welded underneath the opening 24, where the said ring 30 delimits, on one side and on the outside, the aforesaid circular obturator seating 14.

More precisely, one top internal end of the ring 30 is formed by a circumferential undercut 50 made by means of a series of radial holes 54 the centres of which are arranged on a single circumference. The ring 30, in fact, has a portion shaped like a truncated cone, which determines a first circumferential edge 52 having a diameter equal to the diameter of the obturator seating 14, and a second circumferential edge 53 which is located above the first edge and consequently has a larger diameter than the first edge. In addition, the diameter of the second circumferential edge 53 is smaller than the diameter of the opening 24 of the chamber 22, and the edge 53 is connected to this opening 24 through a top surface, which has a circular section, of the ring 30.

The series of holes 54 connects the undercut 50 of the ring 30 with an annular manifold 56 which surrounds the ring 30 on the outside. The aforesaid manifold 56 is provided with a pipe 57, which connects it to an external fan (not illustrated) or directly to the outside environment.

The obturator seating 14 can be closed by a vertical movement of an obturator 16 provided at the bottom with a cup 17 shaped like a reversed truncated cone, which co-operates with the portion, also shaped like a truncated cone, of the undercut 50.

More precisely, the truncated cone of the cup 17 has a height and an angle between the generatrix of the frustum of the cone and the vertical such as to cause two circumferences of the conical surface of the frustum of the cone to rest on the two circumferential edges 52 and 53.

In this way, closing of the seating 14 is obtained with the obturator 16. This closing also becomes hermetic thanks to a negative pressure in the annular space delimited by the vertical and horizontal walls of the undercut 50 and by the surface shaped like a truncated cone of the cup 17. Thanks to the series of holes 54, hermetic closing of the annular manifold 56 and of the pipe 57 is obtained, starting from an external fan (not shown) or directly by exploiting the pressure of the outside environment.

The obturator 16 is fixed at the bottom in a stable way to a top end of a cylindrical stem 20.

The stem 20 slides vertically on the axis of the valve 10 within two bushings 32. The bushings 32 are supported by supporting elements, such as radial spokes 34 connected at the bottom to the ring 30.

A circular opening 38 is made at the bottom of the inlet pipe 28 at a point corresponding to the axis of the valve 10. Inserted in this opening 38 is a cylindrical element 40 provided, on the inside, with an annular gasket 42 made of graphite, which forms a secure seal.

The stem 20 develops for a length such that it can cause the obturator 16 to assume various positions when it is controlled by appropriate actuating means 18. The stem 20 moreover terminates, at the end opposite to the obturator 16, with a hardened plate 36, where the aforesaid means 18 for operating the obturator 16 act.

In the example represented in FIG. 4, the means 18 for operating the obturator 16 comprise a supporting structure 60 which supports a crank 62 in such a way that the latter can turn, the said crank being provided with a connecting rod 64. One end of the connecting rod 64, opposite to the end connected to the crank 62 in 61, is connected with a pin 63 to a rocker arm 66 pivoted, almost at the centre, in 65, on the supporting structure 60 itself. The rocker arm 66 has two ends provided with bearings 68. In the example shown, the two ends move two hardened plates 36 of two valves 10.

FIG. 2 illustrates the arrangement for controlling the valves in the plant with three chambers 22. In particular, only the means 18 for actuating the valves 10 are shown.

As may be noted, there are three supporting structures 60, each of which supports one rocker arm 66 and one crank 62. Each of the cranks 62, which are toothed around their periphery, is engaged by a gear wheel 47 fitted on a longitudinal central shaft 67.

A thermal-regeneration plant for depuration of emissions comprises a set of chambers or towers 22, three in number in the example illustrated, or five or even more, provided at the top with a combustion chamber common to the chambers 22.

As has been seen in FIGS. 1 and 4, underneath the chambers 22 two pipes are provided, namely, one inlet pipe 28 for entry for the emission to be treated and one outlet pipe 29 for exit of the emission that has been treated. Each chamber 22 is connected to the two pipes 28 and 29 via two valves 10, one for each pipe.

Opening and closing of the valves 10 is obtained by rotation of the aforementioned actuating means 18 of the type illustrated in FIG. 4.

By rotation of the crank 62, for example actuated by means of a control deriving from the central shaft 67, the rocker arm 66 is made to oscillate about the pin 65. Consequently, the ends of the rocker arm 66 move in an alternating way upwards and downwards. The ends of the rocker arm 66 thus push vertically the stems 20 of the valves 10 of the two pipes, namely the inlet pipe 28 and the outlet pipe 29, via contact of the bearings 68 on the plates 36 of the stems 20.

In the absence of this raising movement actuated by the ends of the rocker arm 66, with consequent opening of the obturator 16 from its seating 14, the valve 10 remains closed on account of the weight of the assembly formed by the obturator 16 and the stem 20.

All the cranks 62 of the actuating means 18 are aligned according to one and the same axis and are driven by the gear wheels 47 arranged on the single shaft 67. The connecting rods 64 are, instead, mounted staggered with respect to one another in such a way that, all together, they cover an angle of 360°; i.e., they are staggered with respect to one another by 120° if the chambers 22 are three in number, or by 72° if the chambers 22 are five in number.

With this plurality of valves 10 it is possible to obtain an incoming emission flow and an outgoing emission flow which traverse the plant in a continuous way with a constant flow rate. For a given opening of a first inlet valve, the subsequent second inlet valve is correspondingly out of phase, and accordingly also the third valve. At each minimal variation of the first valve, the second valve varies in complete accordance, as does also the third valve.

The hermetic-seal valve for a thermal-regeneration plant for depuration of emissions, which forms the subject of the present invention, affords the advantage of guaranteeing an optimal hermetic tightness over time.

In fact, if the circumferential edges 52 and 53 get damaged on account of the repeated cycles, a fact which is aggravated also by a high operating temperature, or if a deposit of dirt collects on the edges 52 and/or 53 themselves, tightness is ensured thanks to the aforementioned fan, or to the entrance of air from the outside environment, which, moreover, also purges any seepage of emission that has not been completely treated.

The hermetic-seal valve for a thermal-regeneration plant for depuration of emissions thus devised may undergo numerous modifications and variations, all of which falling within the scope of the invention. In addition, all the items may be replaced by technically equivalent ones. In practice, the materials used, as well as the dimensions, may be any whatsoever, according to the technical requirements.

What is claimed is:

1. A hermetic-seal valve for a thermal-regeneration plant for depuration of emissions, said valve being set in a duct (13) which connects an inlet pipe (28) for entry of an emission that is to be treated or an outlet pipe (29) for exit of an emission that has been treated, and a treatment chamber (22), said valve comprising an obturator seating (14), an obturator (16) having the shape of a truncated cone for opening and closing said obturator seating (14), and means (18) for actuating said obturator (16) via an interposed stem (20), said hermetic-seal valve being characterized in that said obturator seating (14) consists of a ring (30), one internal top end of which has a circumferential undercut (50) shaped like a truncated cone and provided with a series of radial holes (54) connected to an external fan or directly to the outside environment (56, 57), said undercut (50) being provided with a first circumferential edge (52), which has a diameter equal to the diameter of the obturator seating (14), and a second circumferential edge (53), which is located above the first edge and is of larger diameter, where both of said edges (52, 53) engage with said obturator (16) shaped like a truncated cone when said stem (20) is displaced.

2. The hermetic-seal valve according to claim 1, characterized in that said series of holes (54) is connected to an annular manifold (56), which surrounds on the outside said ring (30), where said manifold (56) is in turn provided with a pipe (57), which forms a connection to an external fan or directly to the outside environment.

3. The hermetic-seal valve according to claim 1, characterized in that said stem (20) is slidably guided within bushings (32), which are carried by supporting elements (34) that are connected at the bottom to said ring (30).

4. The hermetic-seal valve according to claim 1, characterized in that said means (18) for actuation of said obturator (16) via said interposed stem (20) comprise a supporting structure (60), which is set below said valve and supports a crank (62) so that the latter can turn, said crank (62) being provided with a connecting rod (64) connected (in 61) on one side to said crank (62) and on the other side (in 63) to a rocker arm (66), said rocker arm (66) being pivoted in an intermediate portion (in 65) to said supporting structure (60), said rocker arm (66) carrying at both ends bearings (68), which interact with one end of said stem (20).

5. The hermetic-seal valve according to claim 4, characterized in that said end of said stem (20) has a hardened plate (36), on which said bearings (68) act.

6. A thermal-regeneration plant for depuration of emissions, provided with seal valves according to the preceding claims, said valves being set in a duct (13) which connects both an inlet pipe (28) for entry of an emission that is to be treated and an outlet pipe (29) for exit of an emission that has been treated to a treatment chamber (22), in which more than one means (18) for actuation of respective obturators (16) via interposed stems (20) are provided, characterized in that cranks (62) of said means (18) for actuation of each valve are aligned on one and the same axis, and the respective connecting rods (64) are mounted staggered with respect to one another in such a way that, all together, they cover an angle of 360° according to the treatment chambers (22) present in the plant.

* * * * *